(12) United States Patent
Tan et al.

(10) Patent No.: US 11,931,939 B1
(45) Date of Patent: Mar. 19, 2024

(54) TOGGLE MECHANISM FOR CLOSING OF A MOLD IN A MOLDING MACHINE

(71) Applicant: Haw Chan Tan, Anaheim Hills, CA (US)

(72) Inventors: Haw Chan Tan, Anaheim Hills, CA (US); Oliver E Tan, Fullerton, CA (US)

(*) Notice: Subject to any disclaimer, the term of this patent is extended or adjusted under 35 U.S.C. 154(b) by 0 days.

(21) Appl. No.: 18/049,558

(22) Filed: Oct. 25, 2022

(51) Int. Cl.
B29C 45/66 (2006.01)
B29C 39/04 (2006.01)
B29C 39/22 (2006.01)
B29C 45/17 (2006.01)
B29C 45/68 (2006.01)

(52) U.S. Cl.
CPC ............ B29C 45/661 (2013.01); B29C 39/04 (2013.01); B29C 39/22 (2013.01); B29C 45/1775 (2013.01); B29C 45/681 (2013.01); B29C 45/683 (2013.01)

(58) Field of Classification Search
CPC .... B29C 45/661; B29C 45/681; B29C 45/683
See application file for complete search history.

(56) References Cited

U.S. PATENT DOCUMENTS

| 2,244,123 | A | 6/1941 | Sebek |
| 2,792,592 | A | 5/1957 | McGee |
| 4,022,565 | A | 5/1977 | Bodini |
| 4,088,432 | A | 5/1978 | Farrell |
| 5,178,888 | A | 1/1993 | Wurl |
| 7,114,948 | B2 | 10/2006 | Nishimura et al. |
| 9,802,350 | B2 | 10/2017 | Sasaki |
| 2003/0147989 | A1 | 8/2003 | Kasai et al. |
| 2013/0224329 | A1* | 8/2013 | Keinath ................ B29C 45/661 425/593 |
| 2018/0099443 | A1 | 4/2018 | Lechner et al. |

FOREIGN PATENT DOCUMENTS

| CN | 108859034 A | 11/2018 |
| DE | 10242290 A1 | 4/2004 |
| DE | 102014004379 A1 | 10/2014 |
| DE | 202015002779 U1 | 4/2015 |
| EP | 0164419 A1 | 12/1985 |
| EP | 2451626 B1 | 5/2012 |

* cited by examiner

Primary Examiner — Thu Khanh T. Nguyen
(74) Attorney, Agent, or Firm — Sam Pierce

(57) ABSTRACT

According to an aspect of the present invention, there is provided a mechanism for opening, closing, and clamping a mold or die of an injection molding machine comprising: at least two sets of first toggle linkages opposed to each other; at least two sets of second toggle linkages hingedly connected to said first toggle linkages; at least 2 linear activating means for driving the mechanism towards a closed or open position hingedly connected to said second toggle linkages; a movable platen hingedly connected to first toggle linkages for holding an injection molding die, mold, or die casting die; and at least 2 sets of guide rods for the movable platen to slidingly move along its travel path.

3 Claims, 2 Drawing Sheets

TOGGLE MECHANISM FOR CLOSING OF A MOLD IN A MOLDING MACHINE

BACKGROUND OF THE INVENTION

Modern injection molding machines impart a clamping force on both halves of the mold or die by means of a toggle lock that is actuated by a crosshead and single hydraulic piston acting in the same direction as the required clamping force. The die platten that is being moved is guided by rods to ensure alignment of the mold or die halves. The toggle mechanism redirects the force from the hydraulic piston usually by a moving crosshead to the two halves of a die or mold to clamp them together for the duration of the injection process. In a typical molding machine clamping unit with a central driving piston acting on a crosshead there will be bending non coaxial stresses induced on the central driving shaft causing unnecessary wear and stress. The closing mechanism described herein eliminates this shaft bending issue and the central shaft. The toggle mechanism of a typical mold closing unit typically swings inwards towards the centrally mounted piston providing the clamping force. This reduces the amount of free space available in the central area of the mold or die platen for the positioning of material injection machine tubing or workpiece ejection devices. The mechanism described herein has toggle linkages that do not displace into the area towards the central shaft. In addition to the mechanism described herein not having a central shaft this improvement allows more space in the region of the centerline of the closing mechanism for other machines or devices typically used in injection molding machines. Examples of other machines or devices other than the closing mechanism include but are not limited to vacuum pumps, heating coils, material injectors, workpiece ejectors, mold release agent sprayers, or workpiece removal devices. In the locked position a typical toggle mechanism of an injection molding machine will displace or bend the guide rods as a part of their design to help hold the toggle mechanism in the closed or locked position, thus preventing the mold or die halves from separating until the work cycle is complete.

FIELD OF THE INVENTION

This mechanism relates to injection molding machines, plastic injection molding machines, and particularly die casting machines for ferrous and non-ferrous metal alloys. This mechanism, more particularly, relates to a clamping unit of the mold or die on an injection molding machine.

DETAILED DESCRIPTION

Figure 1:
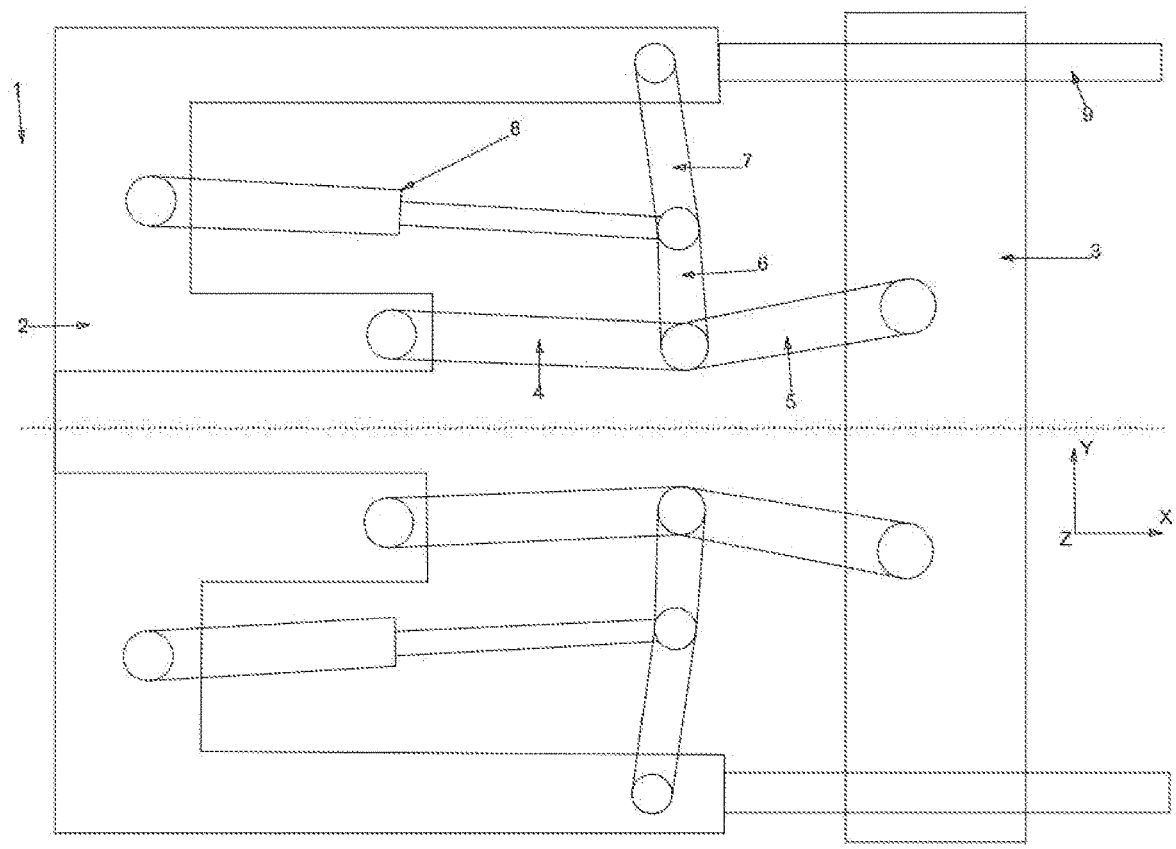
FIG. 1 shows the side view of part of the closing mechanism of an injection molding machine in a closed and locked position where the centerline of the mechanism is the dotted line.

In the figures a part of a closing mechanism 1 of an injection molding machine is shown. In FIG. 1 the closing mechanism 1 comprises a housing 2 and a movable platen 3 that closes against a fixed platen not-shown in the X direction sliding along rod 9 to close the die or mold halves not-shown with sufficient clamping pressure to withstand the forces sustained while the material is being injected into the die or mold, a first toggle linkage of bars 4 and 5 which extend and that is hingedly connected at bar 4 to housing 2 and pushes against housing 2 to close movable platen 3 which is hingedly connected to bar 5, a second toggle linkage of bars 6 and 7 which extend and that is hingedly connected at bar 7 to housing 2 and pushes against housing 2 to drive bar 6 against the hinged connection between bars 4 and 5 and 6 in the Y direction, a linear actuating means 8 hingedly connected to housing 2 that drives the hinged connection of said second toggle linkage of bars 6 and 7. Examples of said linear actuating means include, but are not limited to: hydraulic piston, pneumatic piston, electronic or manually driven ball screw, rack and pinion, preferably hydraulic piston. Linear actuating means 8 extends the second toggle linkage, which in turn extends the first toggle linkage thus closing and clamping the mold or die.

In the locked position as shown in FIG. 1 a reaction force is generated by the clamping force between platen 3 and the opposing platen not-shown. This reaction force is translated from the first toggle linkage of bars 4 and 5 in the X direction against the hinged connection between bars 4, 5, 6 to pull the second toggle linkage of bars 6 and 7 in tension in the Y direction against housing 2 at the hinged connection between housing 2 and bar 7. In this locked position the clamping force is redirected into the first and second toggle linkages and the linear actuating means does not need to provide additional actuating force to keep the entire mechanism closed. The first and second toggle linkages as well as any housing body of the mechanism can undergo deformation under the transmitted force of clamping. Under this deformation the first set of toggle linkages are hyperextended past a coplanar position. The deformation of any part of the mechanism would be within reasonable means of the material properties of each part of the mechanism known to any person of ordinary skill in the art. At least two or more sets of such connected toggle linkages radially opposed and mirrored about the centerline of the mechanism would satisfy the operability of the mechanism structure. The number of radially opposed linkages used can vary, allowing a scalability of the mechanism to achieve a clamping force limited only by either material property constraints or the limits of commercially or otherwise available linear actuators. A preferred embodiment of this mechanism would be to have a set of three connected toggle linkages arranged radially around the centerline axis, noted by the dotted line in FIG. 1, of an injection machine spaced evenly. This radial arrangement of three toggle linkages would reduce either the vertical or horizontal displacement of the machine and provide a sufficiently considerable clamping force upon the platen and die halves. This describes the closed position of the mechanism, which can also be described as a momentary position of the closing phase of the mechanism. The closed position of the mechanism would similarly describe the clamping or clamped position of the mechanism.

Figure 2:
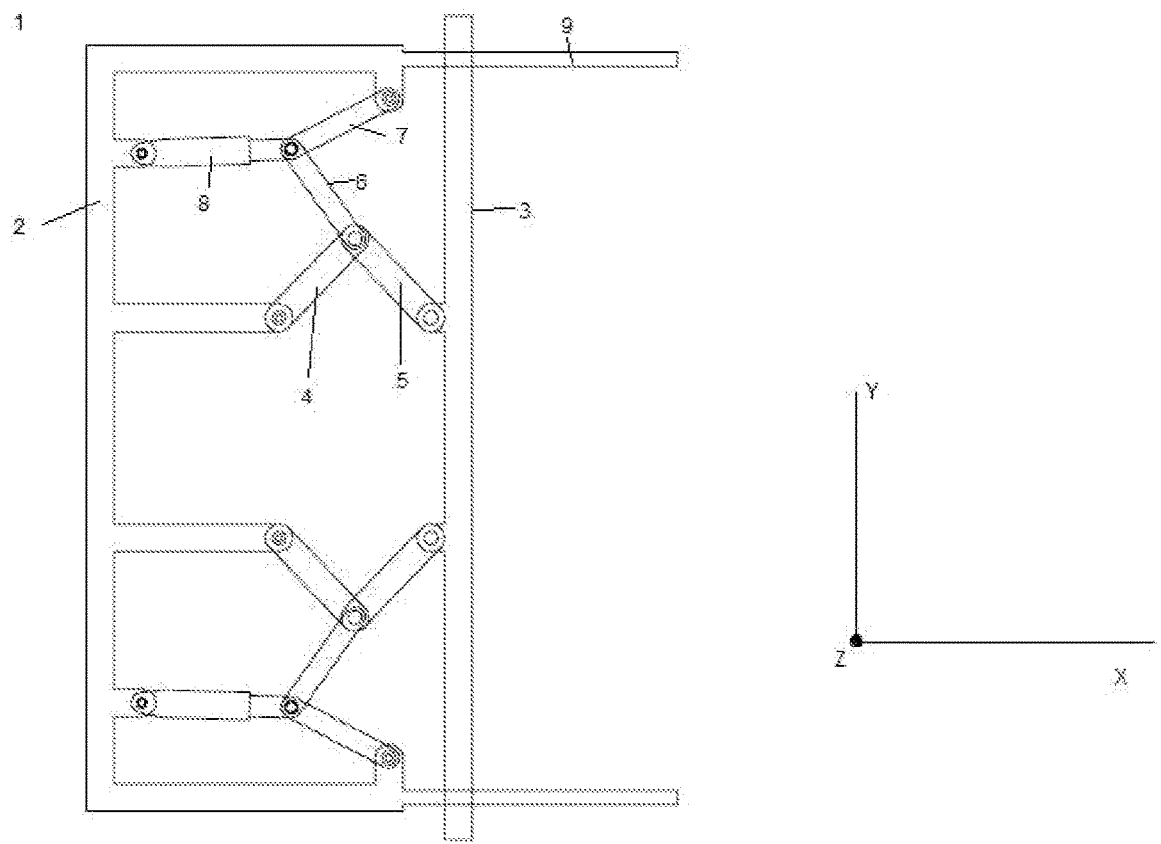
FIG. 2 shows the side view of a part of the closing mechanism of an injection molding machine in the opened position.

In the opened position of the mechanism shown in FIG. 2 a linear pulling force from the linear actuating means 8 has pulled the hinged connection of the second toggle linkage between bars 6 and 7 in the X direction causing the second toggle linkage to contract. This force is transmitted by the second toggle linkage into a vertical pulling force against the first toggle linkage of bars 4 and 5 at the hinged connection where bars 4, 5, and 6 join causing the hinged connection to move in the Y direction. The contraction of the second toggle linkage by linear actuating means 8 pulls on and contracts the first toggle linkage, which in turn pulls at the hinged connection between bar 5 and platen 3 causing platen 3 to slide along rod 9 in the X direction thus opening the mold halves not-shown. This describes the opened position of the mechanism, which can also be described as a momentary position of the opening phase of the mechanism.

The invention claimed is:

1. A toggle mechanism for opening, closing, and clamping a mold in a molding machine, comprising:
    a housing (2) having a bottom and a surrounding wall;
    a movable platen (3) for holding the mold;
    at least two sets of first toggle linkages (4, 5) opposed to each other; wherein each set of first toggle linkage includes a first bar (4) and a second bar (5);
    at least two sets of second toggle linkages (6, 7) hingedly connected to said first toggle linkages (4, 5), each set of the second toggle linkage includes a third bar (6) and a fourth bar (7);
        wherein the first bar (4), the second bar (5) and the third bar (6) are hingedly connected at first ends of the first bar, the second bar, and the third bar (4, 5, 6);
    at least two linear actuating means (8), wherein one end of each linear actuating means hingedly attached to the second toggle linkages (6, 7) at the second end of the third bar (6) and the first end of fourth bar (7); wherein a second end of each linear actuating means (8) hingedly attached to the bottom of the housing (2);
    wherein the second end of the first bar (4) is hingedly connected to a support extending from the bottom of the housing (2), the second end of the second bar (5) is hingedly connected to a surrounding wall of the housing (2), and the second end of the fourth bar (7) is hingedly connected to a bottom of the movable platen (3);
    at least 2 sets of guide rods for the movable platen to slidingly move along its travel path to move the mold from opened position to closed position;
    wherein when the mold is in the closed position, the reactionary force of the mold causes the at least two sets of the first toggle linkages (4, 5) to hyper extend past a co-planar state;
    wherein the at least two sets of first toggle linkages (4, 5) are designed and positioned such that during the opening of the mold, the at least two sets of first toggle linkages (4, 5) will contract and move in opposing directions to each other away from a centerline of the mechanism, and during the closing of the mold, the at least two sets of first toggle linkages (4, 5) will extend towards each other and towards the centerline of the mechanism but not extending too far into the open space between said first toggle linkages, such that other molding or material injecting apparatus and accessories necessary to complete the work cycle process can be mounted and utilized in the open space surrounding the centerline of the mechanism between the housing, first toggle linkages, and movable platen.

2. An injection molding machine comprises a toggle mechanism according to claim 1.

3. A die casting machine comprises a toggle mechanism according to claim 1.

* * * * *